United States Patent [19]

Cluley et al.

[11] 3,949,484
[45] Apr. 13, 1976

[54] VERTICAL MOVEMENT DETECTION SYSTEMS

[75] Inventors: Edward Samuel Cluley, Leicester; Christopher Heaps, Oadby, both of England

[73] Assignee: The English Electric Company Limited, London, England

[22] Filed: May 22, 1974

[21] Appl. No.: 472,287

[52] U.S. Cl. .................................. 33/367; 73/401
[51] Int. Cl.² .......................................... G01C 5/04
[58] Field of Search ................. 33/367, 378; 73/401

[56] References Cited
UNITED STATES PATENTS

| | | | |
|---|---|---|---|
| 2,438,758 | 3/1948 | Leach | 33/367 X |
| 2,532,883 | 12/1950 | Bennett et al. | 33/367 X |
| 3,048,927 | 8/1962 | Maloof | 33/367 X |
| 3,645,135 | 2/1972 | Hadley | 33/367 X |

Primary Examiner—Houston S. Bell, Jr.
Assistant Examiner—Charles E. Phillips
Attorney, Agent, or Firm—Kirschstein, Kirschstein, Ottinger & Frank

[57] ABSTRACT

A multi-limbed manometer system adapted to detect and record the vertical displacement of different parts of a large structure, e.g., the pedestals and cylinders of a steam turbine installation. The datum level of the liquid in the system is adjusted by changing the pressure of a head of liquid connected to the system, for example, by raising and lowering a reservoir of the system or by moving a piston in a cylinder connected to the system. The floats comprise homogeneous structures having a multiplicity of small air-filled compartments, e.g. an epoxy resin containing air-filled hollow glass balls having a diameter of about 150 microns. A float in a reference limb provides a reference signal indicative of the actual liquid level which is compared with a signal indicative of the desired liquid level and a difference signal derived and used to raise and lower the reservoir or move the piston in the cylinder.

15 Claims, 6 Drawing Figures

VERTICAL MOVEMENT DETECTION SYSTEMS

The present invention relates to vertical movement detection systems employing multi-limbed manometers such as can be used to measure and record the vertical displacement of different parts of a large structure, for example, the pedestals and cylinders of a steam turbine installation.

With steam turbine installations vertical displacement may take place relatively slowly over a long period of time due to the settling of the foundations of the installations, or may take place relatively rapidly due to thermal expansion and contraction of parts of the installation when large temperature changes occur during running up and running down of the turbine.

In a known multi-limbed manometer system the liquid level in each of the manometer limbs is detected by a thin-walled metal float coupled to an electro-mechanical transducer, the electrical output of the transducer being proportional to the position of the float which depends on the level of the liquid in the limb. The liquid in the manometer system is maintained at a datum level by means of a plunger which is partly immersed in the reservoir of the system and which is raised and lowered to effect adjustment of the datum level. It is a disadvantage of this known system that the raising and lowering of the plunger may cause turbulence in the liquid in the reservoir and consequent disturbance and displacement of the floats in the manometer limbs. Moreover, the thin-walled floats used in the manometer limbs are adversely affected by temperature changes in that their buoyancy does not remain constant and this leads to inaccuracies in the vertical displacements measured by the transducers.

According to one aspect of the present invention a vertical movement detection system employing a multi-limbed manometer has the datum level of the liquid in the system adjusted by changing the pressure of a head of liquid which is connected to the system.

The pressure of the head of liquid may be changed by raising and lowering a reservoir of the system, for example, by an electric motor arranged to respond to the position of a float in one of the limbs of the manometer and maintain the liquid at the datum level.

Conveniently, the reservoir may be supported from a rigid backplate by one or more resilient members which are arranged to be deflected by the electric motor to raise or lower the reservoir.

Alternatively the pressure of the head of liquid may be changed by movement of a piston in a cylinder connected to the system. The piston may be driven by an electric motor arranged to respond to the position of a float in one of the limbs of the manometer and maintain the liquid at the datum level.

According to yet another aspect of the invention an electrical control circuit for a vertical movement detection system includes an electro-mechanical transducer operable by a float in a limb of the manometer and arranged to provide a reference signal indicative of the actual level of the liquid, means for providing a signal indicative of a desired datum level of the liquid, and means for comparing the two signals and deriving a difference signal which can be used to change the pressure of a head of liquid connected to the system so that the liquid is brought to the datum level.

The signal indicative of the datum level may be adjustable to one or more alternative values so that the level of the liquid can be changed to an alternative datum level, thus causing transducers associated with floats in other limbs of the manometer to respond and provide a check that the floats and transducers are functioning.

The electrical control circuit may include recording means arranged to provide a record of signals derived from transducers associated with the floats in all the limbs of the manometer.

According to a further aspect of the invention the floats used in the limbs of the manometer comprise a homogeneous structure having a multiplicity of small air-filled compartments. Conveniently a float may be formed by a body of a suitable epoxy resin containing a multiplicity of uniformly distributed hollow glass balls having a diameter of about 150 microns.

The invention will now be described, by way of example, with reference to the accompanying drawings in which.

Figure 1:
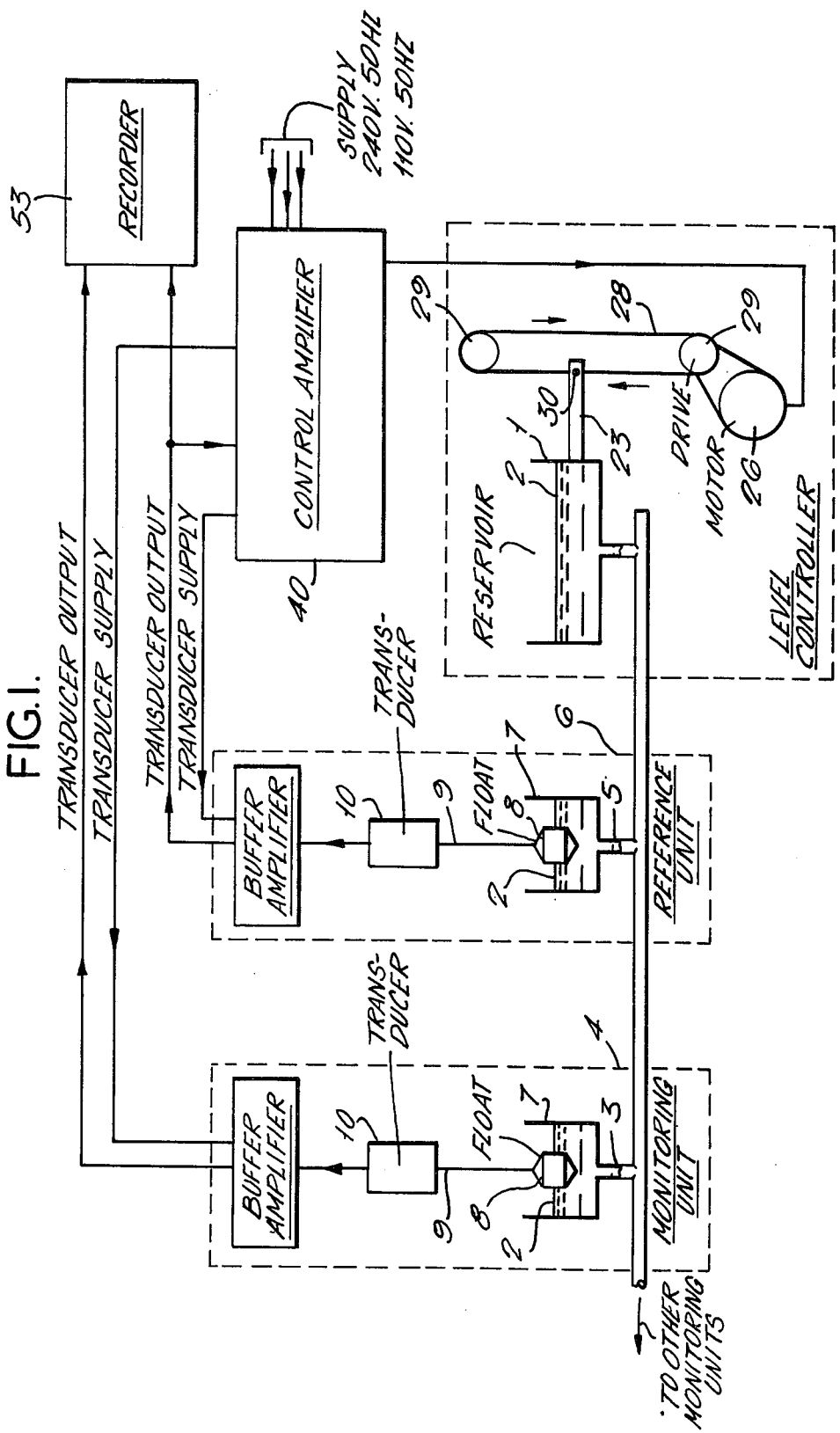
FIG. 1 is a schematic diagram of a vertical movement detection system in accordance with the invention.
Figure 6:
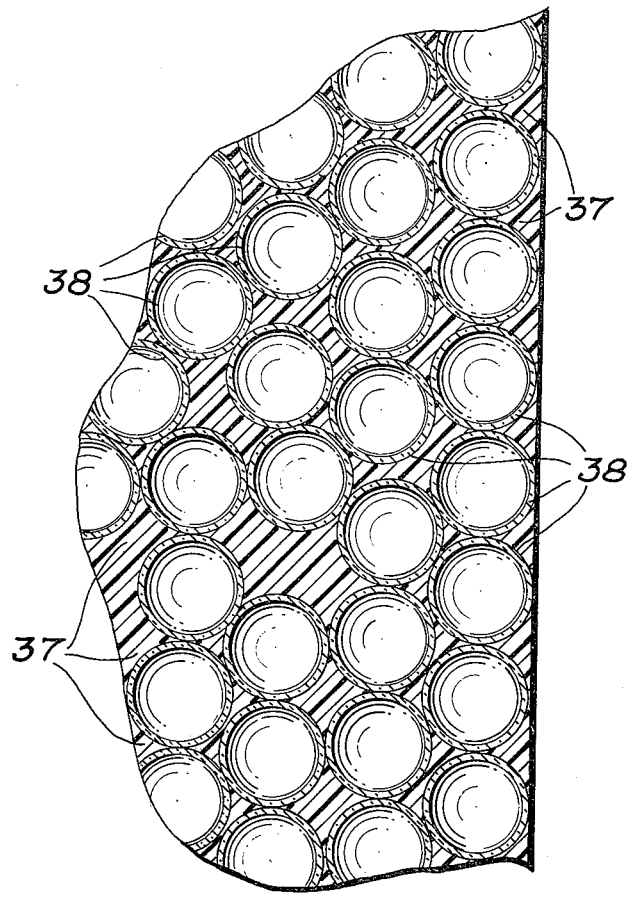

Referring in the first instance to FIG. 1, the vertical movement detection system comprises a multi-limbed manometer having a cylindrical reservoir 1 containing a liquid 2 and communicating with a plurality of limbs 3 each incorporated in a monitoring unit 4 and a further limb 5 incorporated in a reference unit 6. Conveniently, the liquid 2 which is used may, for example, be water. The limb 5 incorporated in the reference unit 6 and each of the limbs 3 incorporated in a monitoring unit 4 comprises a chamber 7 to which the liquid 2 from the reservoir 1 is admitted and which contains a float 8 buoyantly supported by the liquid 2. Each float 8 is a homogeneous structure having a multiplicity of small air-filled compartments and, as shown in FIG. 6, may conveniently be formed by a body 37 of epoxy resin containing a multiplicity of uniformly distributed hollow glass balls 38 having a diameter of 150 microns. The upper end of each float 8 is coupled by a shaft 9 to an associated transducer 10 comprising a DC/DC linear variable transformer with self excitation and an internal demodulator which requires only a DC supply and provides a stepless DC output.

Figure 2:
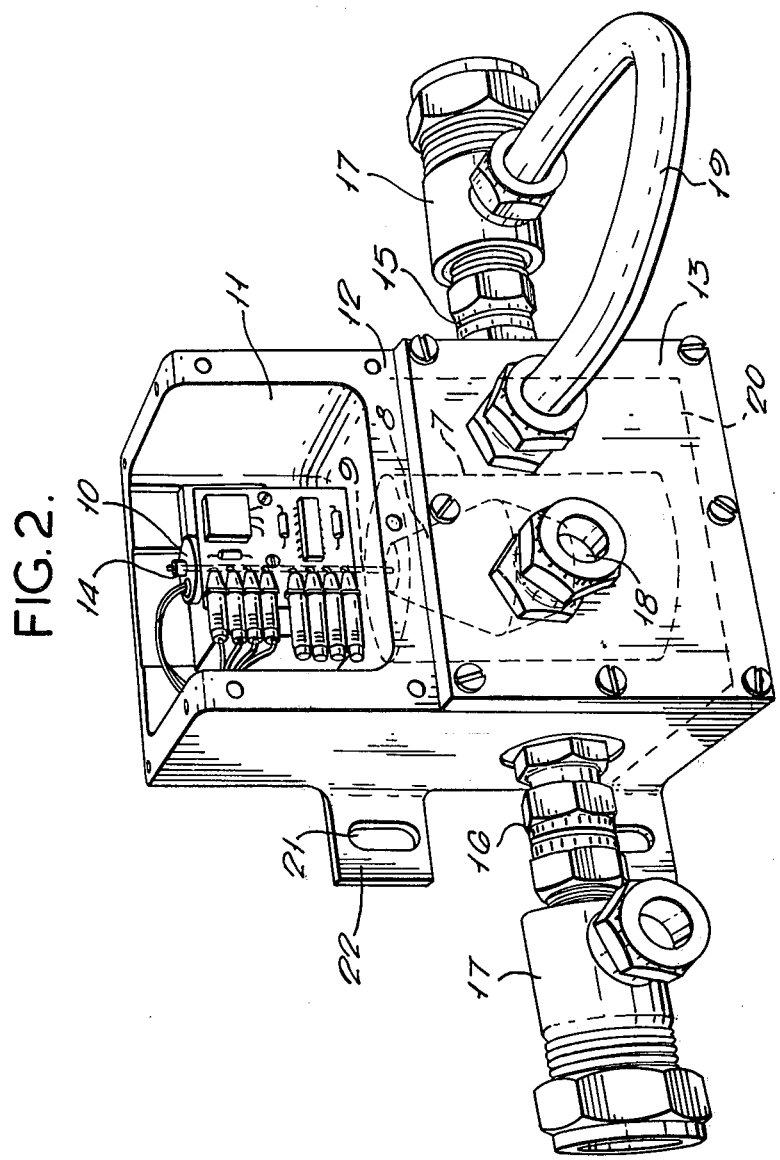
FIG. 2 is a perspective view of one of the vertical movement monitoring units shown schematically in FIG. 1.

As can be seen in FIG. 2 the transducer 10 and associated electrical components are accommodated in an upper compartment 11 of a metal casing 12 while the chamber 7 and float 8 are accommodated in a lower compartment 13 of the casing 12. Low friction bearings 14 are used to support the shaft 9 which connects the float 8 to a slug (not shown) of the transducer 10. The liquid 2 from the reservoir is admitted to the chamber 7 through an inlet pipe 15 and is taken to the chamber 7 of the succeeding monitoring unit through an outlet pipe 16. The inlet pipe 15 and the outlet pipe 16 are provided with a surrounding jacket 17 through which a cooling liquid (e.g., water) is circulated, the cooling liquid also being circulated through pipes 18 and 19 to a jacket 20 within the metal casing 12 surrounding the chamber 7. The monitoring units 4 are located at different parts of a structure which is to be checked for vertical movement, to metal casings 12 being secured to the selected parts of the structure by bolts (not shown) which pass through slotted holes 21 in lugs 22 projecting from the sides of the casing 12. The reference unit 6, which is of similar construction to the monitoring units 4 is mounted in a position which is substantially free from vibration and temperature fluctuations so that it can provide a standard or datum level with which the monitoring units 4 can be compared.

Figure 3:
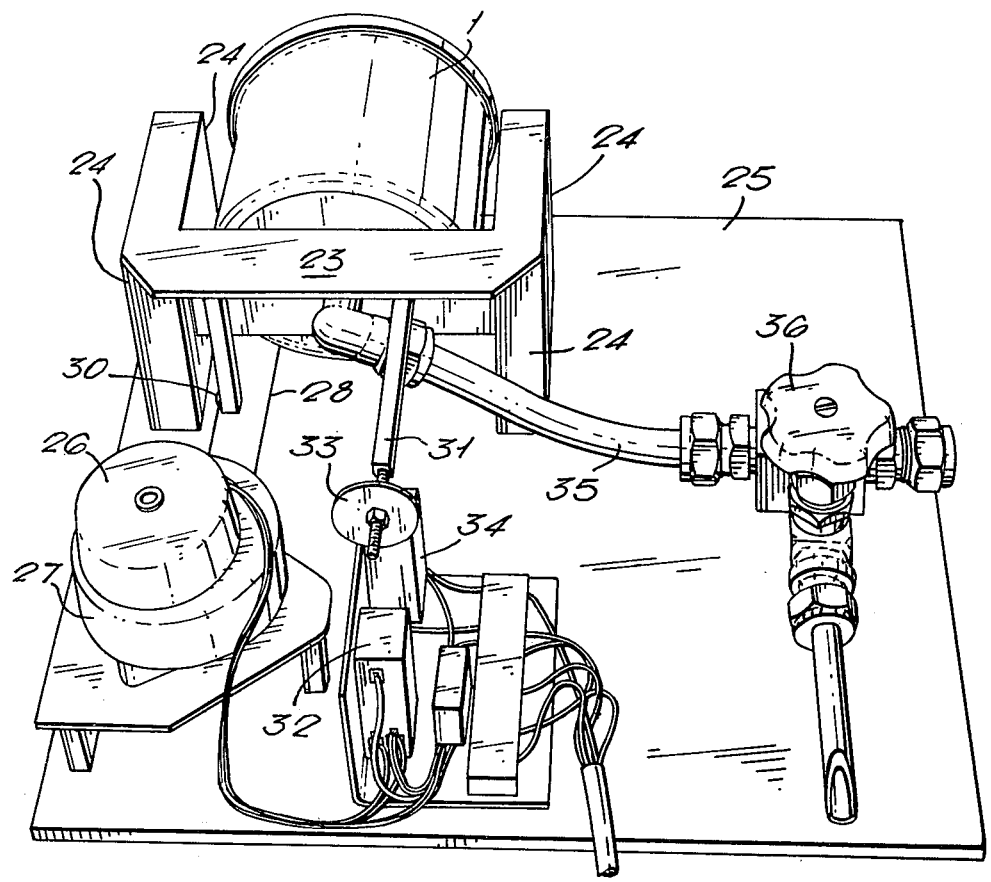
FIG. 3 is a perspective view of a reservoir shown schematically in FIG. 1.

Referring now to FIG. 3, the reservoir 1 is mounted on a metal platform 23 which is supported by four resilient arms 24 extending from a rigid metal backplate 25. Also mounted on the backplate 25 is a reversible synchronous electric motor 26 and a reduction gearbox 27 arranged to drive an endless loop 28 which passes round pulleys 29 (see FIG. 1) and which is attached to the platform 23 at a point 30. When the electric motor 26 is energized it drives the pulleys 29 through the gearbox 27 so that the loop 28 raises or lowers the platform 23 by deflecting the resilient arms 24, thus raising or lowering the reservoir 1 depending on the direction of rotation of the electric motor 26. A metal bar 31 secured to the platform 23 extends downwards and has a lower end arranged to operate a lower limit switch 32 and carries a metal plate 33 arranged to operate an upper limit switch 34. The limit switches 32 and 34 are arranged to provide an indication of excessive movement of the reservoir 1. A flexible tube 35, which connects the reservoir 1 to the monitoring units 4 and the reference unit 6, is provided with a tap 36 for draining the liquid 2 from the manometer.

Figure 4:
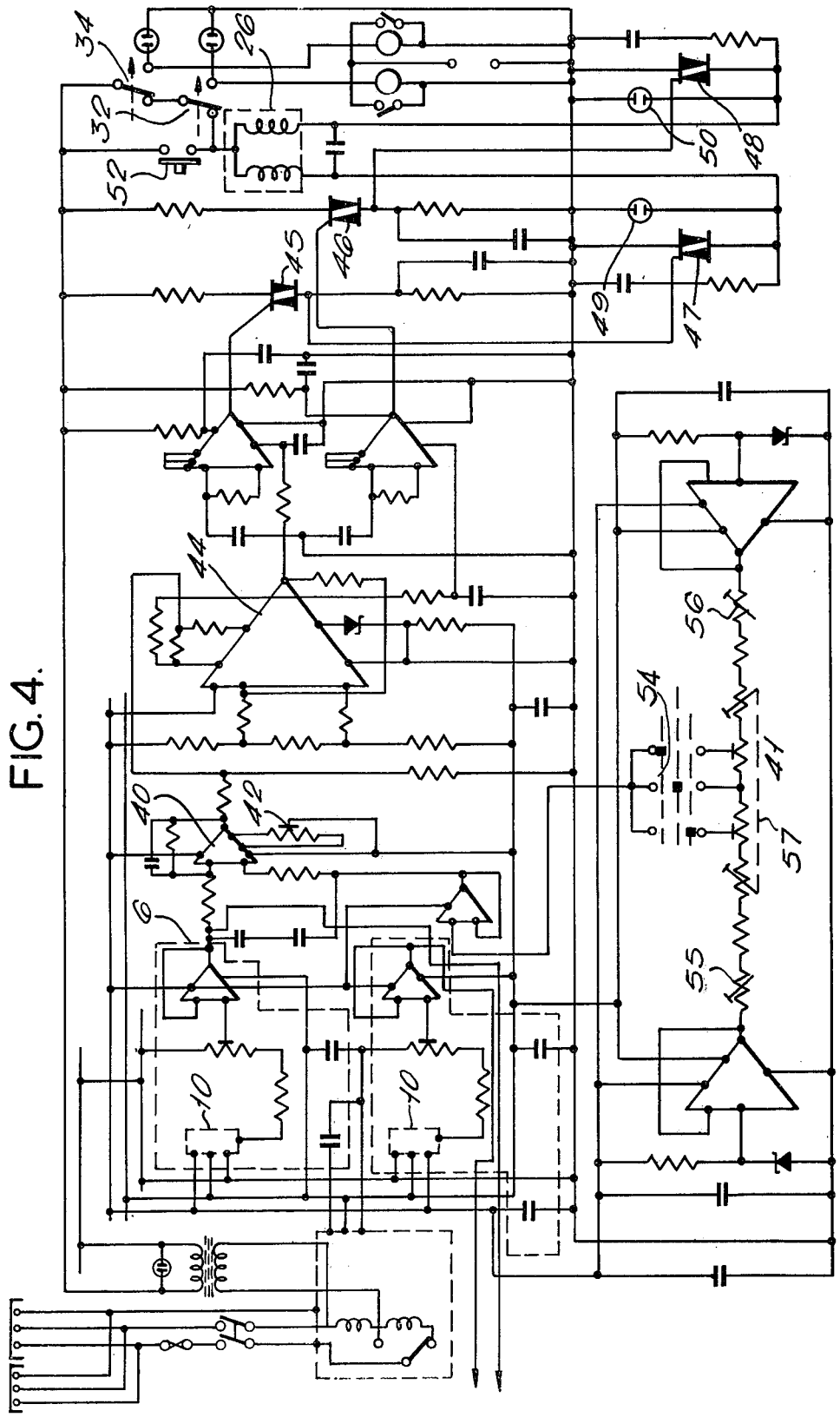
FIG. 4 is a circuit diagram of the electrical control system.

Referring now to FIG. 4, the electrical control system includes an amplifier 40 to which is fed the output from the transducer 10 of the reference unit 6 and the output from a calibrated source 41. The amplifier 40 is adjusted by a potentiometer 42 so that it provides zero output when the outputs form the calibrated source 41 and the transducer 10 of the reference unit 6 are both zero. The output from the amplifier 32 is taken via an attenuator 43 to a comparator 44 the output of which feeds two triacs 45 and 46 in a control circuit for the electric motor 26. The motor control circuit is arranged so that if a change in the datum level of the liquid 2 occurs, due for example to leakage or evaporation, then the two outputs fed to the amplifier 40 become unbalanced and the output of the comparator 44 triggers one of the triacs 45 or 46 depending on whether the datum level of the liquid 2 has risen or fallen. The triacs 45 and 46 are arranged to trigger two further triacs 47 and 48 in a drive circuit for the electric motor 26 which provide a forward and reverse drive for the electric motor 26 to raise or lower the platform 23 and thereby raise or lower the reservoir 1. The triacs 47 and 48 are each connected in parallel with a neon indicator 49 and 50 arranged so that if either of the triacs 47 and 48 is conducting the associated neon indicator is extinguished. Thus when neither of the triacs 47 and 48 is conducting so that the motor is unenergised and the liquid is at the desired datum level, then both neon indicators 49 and 50 are illuminated.

The limit switches 32 and 34 are connected in series in the energizing circuit of the electric motor 26 so that the energizing circuit is broken if the platform 23 is raised or lowered to a position in which one of the limit switches is operated. A further switch 52 connected in parallel with the limit switches 32 and 34 enables the limit switches to be overridden. The output of the transducer 10 of the reference unit 6 and the outputs of the transducers 10 of each of the monitoring units 4 is taken to a recorder 53 which provides a permanent record of the vertical movements monitored by these units. The recorder 53 may be calibrated to measure vertical movements of 0.001 of an inch.

A three-position switch 54 is arranged to provide a means of checking that the monitoring units 4 are functioning correctly and to this end the switch 54 can be thrown to two check positions on either side of a central position to cause an abrupt change in the output of the calibrated course 41 fed to the amplifier 40. The amplifier will therefore be caused to behave as if there as been an abrupt change in the datum level of the liquid 2. The abrupt change in the output of the calibrated source 41 may correspond to an upward or downward movement of the liquid level, depending on which way the switch 54 is thrown and the magnitude of the change is governed by the setting of variable resistors 55 and 56 which form part of the calibrated source 41. The variable resistors 55 and 56 are calibrated to provide settings which correspond to apparent changes in the level of the liquid 2 of 0.001 of an inch. Adjustment of the value of the calibrated source 41 when the switch 54 is in the central position is provided by the ganged variable resistors 57.

In use of the vertical movement detection system the monitoring units 4 are secured to different parts of the structure which is to be checked for vertical movements and the positions of the monitoring units 4 adjusted vertically so that the readings recorded by the recorder 53 are identical with the reading recorded for the reference unit 6. Therefore any subsequent change in the recorded reading of any monitoring unit 4 will indicate that there has been a vertical movement of the part of the structure to which that particular monitoring unit 4 is secured. Any change in the datum level of the liquid 2 due to losses by leakage or evaporation or due to lost liquid being replenished is automatically compensated for by the raising or lowering of the reservoir 1 by the electric motor 26. If no vertical movements are recorded the monitoring units 4 can be checked at intervals to ensure that they are functioning correctly by adjusting one of the variable resistors 55 or 56 and throwing the switch 54 to the appropriate check position so that the output of the calibrated source 41 applied to the amplifier 40 is changed abruptly. Consequently the amplifier 40 is unbalanced and provides an output signal which is applied to the comparator 44 and causes the triacs 47 or 48 in the motor drive circuit to raise or lower the reservoir 1 by an amount corresponding to the setting of the variable resistor 44 or 45. The change in the level of the liquid 2 resulting from the raising or the lowering of the reservoir 1 will produce a corresponding change in the recordings of the monitoring units 4 if they are functioning correctly.

Figure 5:
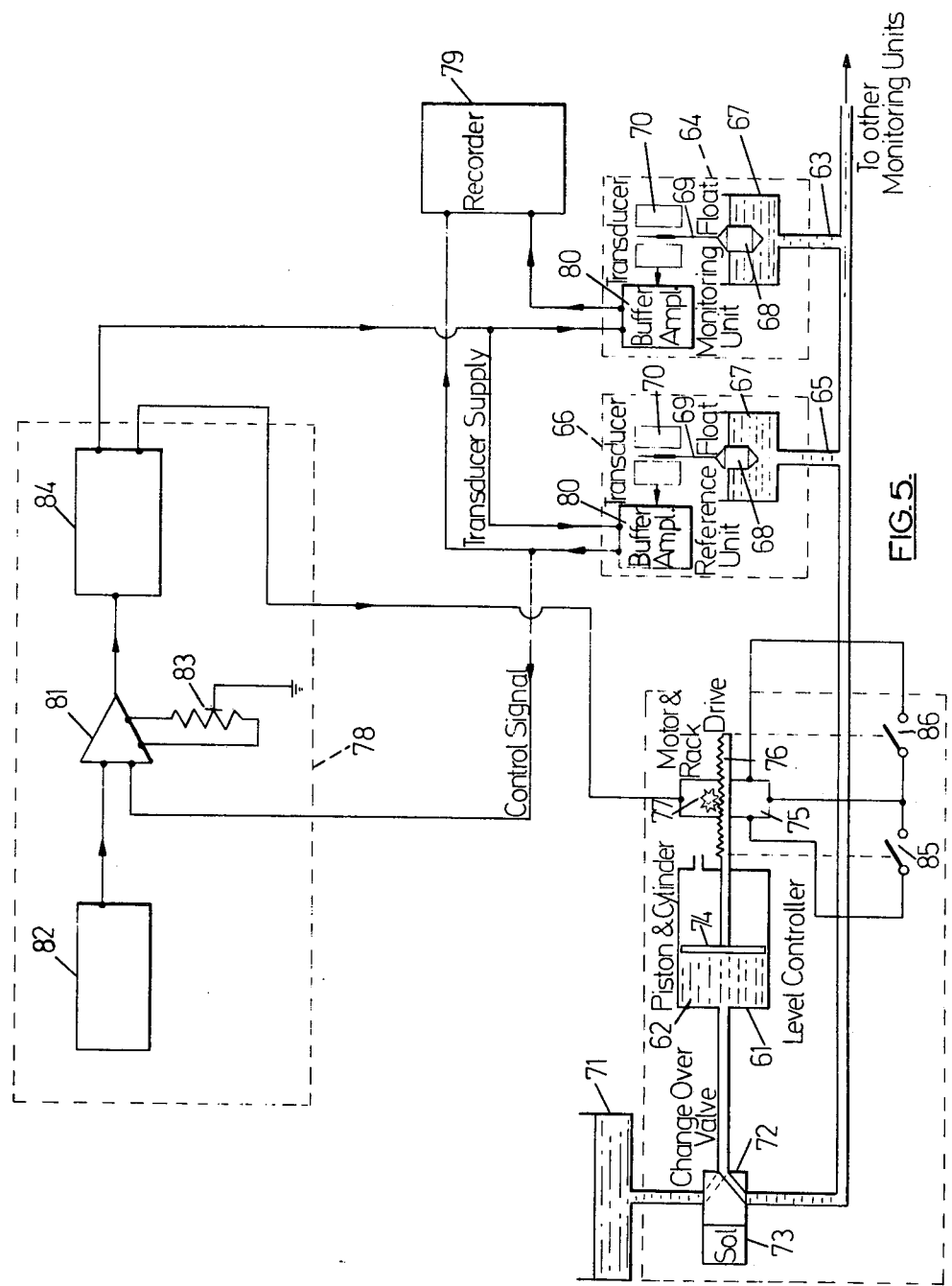
FIG. 5 is a schematic diagram of another vertical movement detection system in accordance with the invention and FIG. 6 shows diagrammatically and to a much enlarged scale a fragmentary vertical cross-section through a float shown in FIGS. 1 and 5.

Referring now to FIG. 5, the vertical movement detection system comprises a multi-limbed manometer having a cylinder 61 containing a liquid 62 and communicating with a plurality of limbs 63 each incorporated in a monitoring unit 64 and a further limb 65 incorporated in a reference unit 66. The limb 65 incorporated in the reference unit 66 and each of the limbs 63 incorporated in a monitoring unit 64 comprises a chamber 67 to which the liquid 62 from the cylinder 61 is admitted and which contains a float 68 buoyantly supported by the liquid 62. Each float 68 is a homogeneous structure having a multiplicity of small air-filled compartments and, as shown in FIG. 6, may be formed by a body 37 of epoxy resin containing a multiplicity of uniformly distributed hollow glass balls 38 having a diameter of 150 microns. The upper end of each float 68 is coupled by a shaft 69 to an associated transducer 70 comprising a DC/DC linear variable transformer with self excitation and an internal demodulator which requires only a DC supply and provides a stepless DC output.

The cylinder 61 also communicates with a tank 71 containing a supply of liquid 62 by way of a change-over valve 72 which is operated by a solenoid 73. Normally the change-over valve 72 connects the cylinder 61 to the limbs 63 and 65, but when the solenoid 73 is operated the limbs 63 and 65 are disconnected and the cylinder 61 is connected to the tank 71. The cylinder 61 contains a piston 74 which is driven by an electric motor 75 through a rack 76 and pinion 77 drive in response to signals received from a control unit 78. The output from each of the transducers 70 is applied to a recorder 79, by way of associated buffer amplifiers 80 forming part of the reference unit 66 and each monitoring unit 64. The piston 74 is arranged to move backwards or forwards in the cylinder and thus raise or lower the level of the liquid in the limbs 63 and 65.

The control unit 78 includes an amplifier 81 to which is fed the output from the transducer 70 of the reference unit 66 and the output from a calibrated source 82. The amplifier 81 is adjustable by a potentiometer 83 so that it provides zero output when the outputs from the calibrated source 82 and the transducer 70 of the reference unit 66 are both zero. The output of the amplifier 81 is arranged to feed two triacs in a drive unit 84 for the electric motor 75. The control unit 78 is arranged so that if a change in the datum level of the liquid 62 in the reference unit 66 occurs, then the two outputs fed to the amplifier 81 become unbalanced and triggers one of the two triacs in the drive unit 84 depending on whether the level of the liquid 62 has risen or fallen.

The two triacs provide a forward and a reverse drive for the electric motor 75 which actuates the rack 76 and pinion 77 drive and moves the piston 74 in the cylinder 61. Circuitry is included in the drive unit 84 to prevent overshoot of the piston 74, due to inherent droop in the datum level control system, by slowly inching the motor 75 when near balance is reached. The piston 74 is coupled to two limit switches 85 and 86 connected in the energizing circuit of the electric motor 75. The limit switches 85 and 86 are arranged to de-energize the motor 75 in the event of over-travel of the piston and to operate an alarm in the control unit 78.

In use of the vertical movement detection system the monitoring units 64 are secured to different parts of the structure which is to be checked for vertical movements and the positions of the monitoring units 64 adjusted vertically so that the readings recorded by the recorder 79 are identical with the reading recorded for the reference unit 66. Therefore any subsequent change in the recorded reading of any monitoring unit 64 will indicate that there has been a vertical movement of the part of the structure to which that particular monitoring unit 64 is secured. Any change in the datum level of the liquid 62 due to losses by leakage or evaporation or due to lost liquid being replenished is automatically compensated for by movement of the piston 74 in the cylinder driven by the electric motor 75.

Should the piston 74 reach a predetermined extreme of travel in either direction, the motor 75 is energized in the appropriate direction to return the piston 74 to a central position in the cylinder 61, irrespective of any other command signal received from the control unit 78. At the same time the solenoid 73 operates the change-over valve 72 to connect the cylinder 61 to the tank 71, so that the liquid 62 may be expelled from or drawn into the cylinder 61.

The vertical movement detection system shown in FIG. 5 is advantageous in that the piston 74 and cylinder 61 do not need to be mounted on the same level as the limbs 63 and 65 of the manometer and may be displaced vertically either above or below the datum level. Moreover, the response time to changes in datum level is considerably reduced due to the more positive changes in the pressure levels.

The vertical movement detection system of the invention is eminently suitable for monitoring the vertical movements experienced by a part of a steam turbine. Such movements may take place relatively slowly over a long period of time due to settling of the foundations or may take place relatively rapidly due to thermal expansion or contraction of parts of turbine installation during running up or running down. In the latter circumstances the difference in thermal expansion between pedestals and other structure supporting the high pressure and low pressure cylinders may result in bending of the turbine shaft with consequent damage to the turbine rotor. The vertical detection system in accordance with the invention may be adopted to prevent such bending of the shaft by monitoring the vertical movements due to thermal expansion and effecting compensating movements of the parts of the installation concerned. To this end hydraulic jacks may be incorporated in the pedestals or other structure supporting the parts of the turbine installation and these hydraulic jacks may be expanded or contacted automatically to compensate for the vertical movements monitored by the monitoring units 4.

Although the vertical movement detection system of the invention is particularly suitable for monitoring the vertical movements of a steam turbine installation it is also suitable for monitoring the vertical movements of buildings, bridges or other structures which may be subject to vertical displacement.

We claim:
1. A vertical movement detection system comprising:
   a. a multi-limbed manometer having one limb mounted in a reference location substantially free from movement and other limbs mounted in locations to be monitored for vertical movement;
   b. a float in said one limb;
   c. an electro-mechanical transducer associated with and coupled to said float in said one limb arranged to produce a reference signal indicative of the level of the liquid in said one limb;
   d. floats in each of said other limbs;
   e. a different electro-mechanical transducer associated with and coupled to the float in each of said other limbs, each arranged to provide a monitoring signal indicative of the level of the liquid in that limb;
f. recording means arranged to produce a record of the reference signal and each of the monitoring signals;
g. a head of liquid connected to the manometer;
h. means for changing the pressure of the head of liquid;
j. means for providing a signal indicative of a desired datum level of the liquid in the said one limb;
k. means for comparing the reference signal and the signal indicative of the desired datum level and deriving a difference signal;
m. means for changing the pressure of the head of liquid in response to the difference signal and thus maintaining the level of the liquid in said one limb at the desired datum level; and
n. means for adjusting the signal indicative of the desired datum level to one or more alternative values so that the level of the liquid in the said one limb can be changed to a corresponding alternative datum level, thus causing the transducers associated with the floats in said other limbs of the manometer to respond and provide a check that these floats and transducers are functioning.

2. A vertical movement detection system as claimed in claim 1, wherein the head of liquid is a reservoir connected to the manometer, and the pressure of the head of liquid is changed by raising and lowering the reservoir.

3. A vertical movement detection system as claimed in claim 2, wherein the reservoir is raised and lowered by an electric motor arranged to respond to the difference signal.

4. A vertical movement detection system as claimed in claim 3, wherein the reservoir is supported from a rigid backplate by one or more resilient members arranged to be deflected by the electric motor to raise and lower the reservoir.

5. A vertical movement detection system as claimed in claim 2, including upper and lower limit switches arranged to provide an indication of excessive upward and downward movement of the reservoir.

6. A vertical movement detection system as claimed in claim 1, wherein the head of liquid is a cylinder connected to the manometer and containing a piston, and the pressure of the head of liquid is changed by movement of the piston in the cylinder.

7. A vertical movement detection system as claimed in claim 6, wherein the piston is driven by an electric motor arranged to respond to the difference signal.

8. A vertical movement detection system as claimed in claim 6, including control means arranged to be actuated when the piston reaches either of two extreme positions in the cylinder and effective to cause the piston to be rapidly moved to an intermediate position, and to operate valve means connecting the piston to a source of liquid, so that liquid may be expelled from or drawn into the cylinder during the rapid movement to the intermediate position.

9. A vertical movement detection system as claimed in claim 1, wherein the liquid in the manometer is water.

10. A vertical movement detection system as claimed in claim 1, wherein the reference location in which said one limb is mounted is substantially free from temperature fluctuations, and the limbs of the manometer are accommodated in casings through which a cooling liquid is circulated.

11. A vertical movement detection system as claimed in claim 10, wherein pipes connecting the limbs of the manometer to the head of liquid are surrounded by jackets through which a cooling liquid is circulated.

12. A vertical movement detection system as claimed in claim 1, wherein the means for comparing the reference signal and the signal indicative of a desired datum level is an amplifier arranged to derive the difference signal and apply it to two controlled semi-conductor devices in a control circuit of an electric motor arranged to change the pressure of the head of liquid.

13. A vertical movement detection system as claimed in claim 2, wherein a float in a limb of the manometer is formed from a material containing a multiplicity of small air filled compartments.

14. A vertical movement detection system as claimed in claim 13, wherein the float is formed by a body of epoxy resin containing a multiplicity of uniformly distributed hollow glass members.

15. A vertical movement detection system as claimed in claim 14, wherein the hollow glass members have a diameter of about 150 microns.

* * * * *